United States Patent
Choi et al.

(10) Patent No.: US 9,106,829 B2
(45) Date of Patent: Aug. 11, 2015

(54) APPARATUS AND METHOD FOR PROVIDING GUIDE INFORMATION ABOUT PHOTOGRAPHING SUBJECT IN PHOTOGRAPHING DEVICE

(75) Inventors: Won-Jong Choi, Anyang-si (KR); Rakie Kim, Suwon-si (KR); Hwan-Sun Sung, Seongnam-si (KR)

(73) Assignee: Samsung Electronics Co., Ltd (KR)

(*) Notice: Subject to any disclaimer, the term of this patent is extended or adjusted under 35 U.S.C. 154(b) by 56 days.

(21) Appl. No.: 13/450,023

(22) Filed: Apr. 18, 2012

(65) Prior Publication Data

US 2012/0262593 A1 Oct. 18, 2012

(30) Foreign Application Priority Data

Apr. 18, 2011 (KR) .......................... 10-2011-0035541

(51) Int. Cl.
*H04N 5/225* (2006.01)
*H04N 5/232* (2006.01)

(52) U.S. Cl.
CPC ....... *H04N 5/23219* (2013.01); *H04N 5/23222* (2013.01)

(58) Field of Classification Search
CPC ........................ H04N 5/23219; H04N 5/23222
See application file for complete search history.

(56) References Cited

U.S. PATENT DOCUMENTS

| | | | |
|---|---|---|---|
| 2002/0171746 A1* | 11/2002 | Stephany et al. | 348/239 |
| 2004/0218916 A1* | 11/2004 | Yamaguchi et al. | 396/263 |
| 2005/0007468 A1* | 1/2005 | Stavely et al. | 348/239 |
| 2005/0201594 A1* | 9/2005 | Mori et al. | 382/107 |
| 2005/0271257 A1* | 12/2005 | Suzuki et al. | 382/118 |
| 2006/0203104 A1* | 9/2006 | Vau et al. | 348/231.3 |
| 2007/0182823 A1* | 8/2007 | Maruyama et al. | 348/207.99 |
| 2007/0188644 A1* | 8/2007 | Okamoto | 348/333.01 |
| 2008/0117310 A1* | 5/2008 | Kaneda et al. | 348/231.2 |
| 2008/0297617 A1* | 12/2008 | Jeong | 348/222.1 |
| 2008/0309796 A1* | 12/2008 | Abe | 348/231.99 |
| 2009/0015702 A1* | 1/2009 | Garcia Alonso | 348/333.02 |
| 2009/0153692 A1* | 6/2009 | Koide | 348/222.1 |
| 2009/0256933 A1* | 10/2009 | Mizukami | 348/240.1 |
| 2010/0033590 A1* | 2/2010 | Kawaguchi | 348/222.1 |
| 2010/0039527 A1* | 2/2010 | Kretz et al. | 348/222.1 |
| 2010/0149343 A1* | 6/2010 | Kim et al. | 348/169 |
| 2010/0245610 A1* | 9/2010 | Ahn et al. | 348/222.1 |

FOREIGN PATENT DOCUMENTS

KR 20090122572 12/2009

* cited by examiner

*Primary Examiner* — Twyler Haskins
*Assistant Examiner* — Dwight C Tejano
(74) *Attorney, Agent, or Firm* — The Farrell Law Firm, P.C.

(57) ABSTRACT

An apparatus and method for photographing a subject in a photographing device are provided. The method includes determining a capture pose; determining a pose of a subject for photographing; and photographing the subject automatically based on a similarity between the capture pose and the pose of the subject.

16 Claims, 8 Drawing Sheets

APPARATUS AND METHOD FOR PROVIDING GUIDE INFORMATION ABOUT PHOTOGRAPHING SUBJECT IN PHOTOGRAPHING DEVICE

PRIORITY

This application claims priority under 35 U.S.C. §119(a) to a Korean Patent Application filed in the Korean Intellectual Property Office on Apr. 18, 2011 and assigned Serial No. 10-2011-0035541, the entire disclosure of which is incorporated herein by reference.

BACKGROUND OF THE INVENTION

1. Field of the Invention

The present invention relates generally to an apparatus and method for photographing a subject using a photographing device.

2. Description of the Related Art

A photographing device is a device that stores pictures generated by photographing a subject. The photographing device may be a digital camera. The digital camera stores a picture, which is detected using an electronic sensor in a digital image file or digital moving picture file form instead of using film.

Recently, the development of a digital technology has led to an increase of digital cameras, making it possible for the public having no professional knowledge in photography to easily use digital cameras.

As the use of digital cameras increases, there is an increase of photography by amateurs. There is a problem in that it is difficult for such a person to photograph a subject of various compositions and poses like a professional photographer or a professional model.

SUMMARY OF THE INVENTION

Accordingly, photographing devices need a user interface for providing guide information about capturing photographs to the public.

An aspect of the present invention is to substantially solve at least the above problems and/or disadvantages and to provide at least the advantages below. Accordingly, one aspect of the present invention is to provide an apparatus and method for providing photographing guide information in a photographing device.

Another aspect of the present invention is to provide an apparatus and method for determining a capture pose based on subject information in a photographing device.

A further aspect of the present invention is to provide an apparatus and method for determining a capture pose based on the number of subjects, the relationship between the subjects, and a photographing location of a photographing device.

Yet another aspect of the present invention is to provide an apparatus and method for automatically photographing a subject according to capture pose information in a photographing device.

Still another aspect of the present invention is to provide an apparatus and method for transmitting capture pose information to a portable device of a subject in a photographing device.

The above aspects are achieved by providing an apparatus and method for photographing a subject in a photographing device.

According to one aspect of the present invention, a method for photographing a subject using a photographing device is provided. The method includes determining a capture pose; determining a pose of a subject for photographing; and photographing the subject automatically based on a similarity between the capture pose and the pose of the subject.

According to another aspect of the present invention, an apparatus for photographing a subject in a photographing device is provided. The apparatus includes a display unit for displaying a picture of a subject; a controller for determining a capture pose, and controlling a photographing unit to photograph the subject automatically based on a similarity between the capture pose and the pose of the subject; and the photographing unit for photographing the subject.

BRIEF DESCRIPTION OF THE DRAWINGS

The above and other aspects, objects, features and advantages of the present invention will become more apparent from the following detailed description when taken in conjunction with the accompanying drawings in which.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

An embodiment of the present invention describes a technology for automatically photographing a subject considering the subject's capture pose information in a photographing device.

In the following description, the photographing device includes a digital camera, a portable terminal with a camera module, a mobile communication terminal, a Portable Digital Assistant (PDA), a laptop computer, a smartphone, a netbook, a television, a Mobile Internet Device (MID), an Ultra Mobile Personal Computer (UMPC), a tablet PC, a Global Positioning System (GPS) terminal, an MPEG-1 audio layer 3 (MP3) player, and the like.

Figure 1:
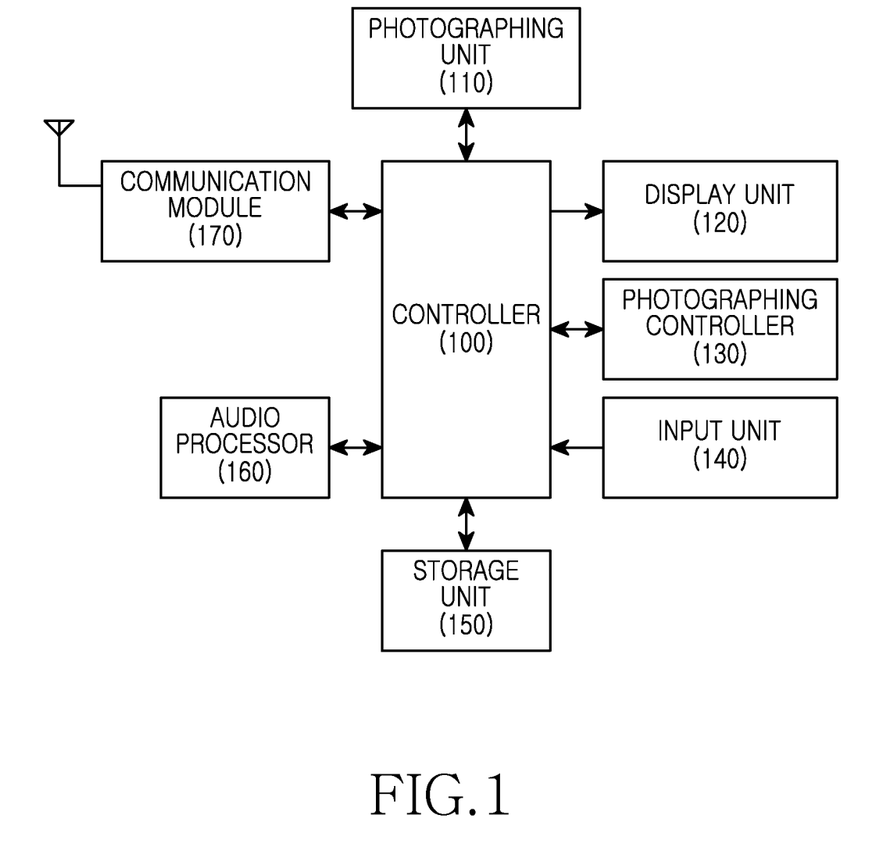
FIG. 1 is a block diagram illustrating a photographing device according to the present invention.

FIG. 1 illustrates a a photographing device according to the present invention.

As illustrated in FIG. 1, the photographing device includes a controller 100, a photographing unit 110, a display unit 120, a photographing controller 130, an input unit 140, a storage unit 150, an audio processor 160, and a communication module 170.

The controller 100 controls the general operation of the photographing device.

In the case in which a shutter button input by a user is detected through the input unit 140, the controller 100 controls the photographing unit 110 to photograph a subject.

The controller 100 controls the photographing unit 110 to photograph a subject considering a capture pose selected in the photographing controller 130. For example, the controller 100 controls the photographing unit 110 to capture a picture of a subject considering the similarity between the capture pose selected in the photographing controller 130 and a subject pose included in picture data provided through the photographing unit 110 as illustrated in FIGS. 3 to 6.

The controller 100 controls to transmit pose change information to the portable device of a subject. For example, the controller 100 controls to transmit a capture pose determined in the photographing controller 130 to the portable device of the subject. The portable device of the subject can display the capture pose by an outline or a preset image so that a user identifies the capture pose. As another example, the controller 100 transmits comparison information of a currently gathered subject pose and the capture pose determined in the photographing controller 130, to the portable device of the subject. The portable device of the subject can display pose change information of the subject according to the comparison information. The controller 100 can establish a communication link with the portable device of the subject through the communication module 170.

Figure 7:
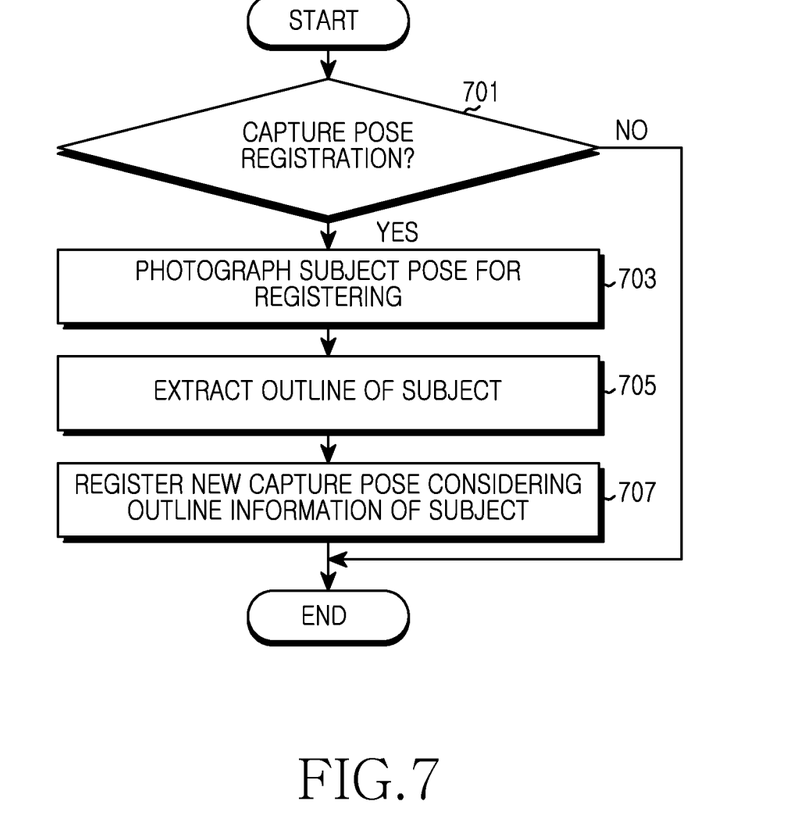
FIG. 7 is a flowchart illustrating a process for registering a capture pose in a photographing device according to an embodiment of the present invention.
Figure 8:
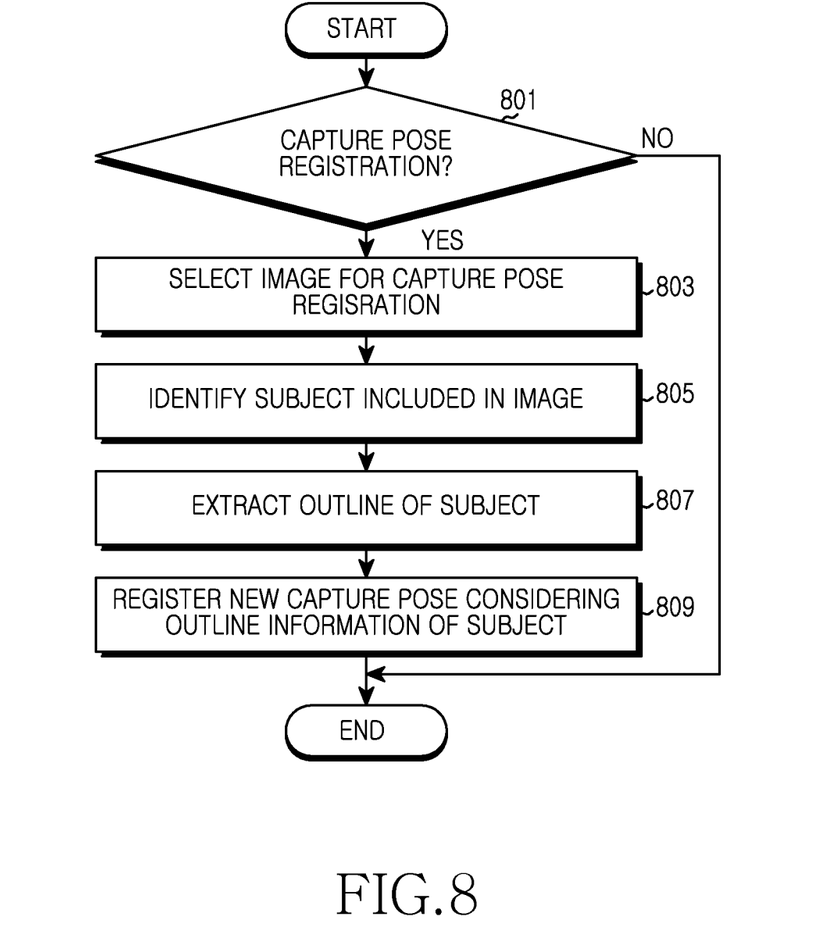
FIG. 8 is a flowchart illustrating a process for registering a capture pose in a photographing device according to another embodiment of the present invention.

The controller 100 registers a new capture pose. For example, the controller 100 controls to register a new capture pose as illustrated in FIGS. 7 and 8.

The photographing unit 110 photographs a subject under the control of the controller 100. For example, the photographing unit 110 includes a lens, a camera sensor for converting an optical signal photographed through the lens into an electric signal, and a signal processor for converting an analog picture signal photographed from the camera sensor into digital data.

The display unit 120 displays state information of the photographing device, a menu screen, picture data provided through the photographing unit 110 and the like, according to the control of the controller 100. For example, the display unit 120 may display a capture pose selected in the photographing controller 130 by an outline according to the control of the controller 100. The picture data includes preview information provided through the photographing unit 110 and captured picture information.

In the case in which the display unit 120 includes a touch screen, the display unit 120 provides touch information of the touch screen to the controller 100.

The photographing controller 130 determines a capture pose for photographing a subject. For example, the photographing controller 130 determines a capture pose for photographing a subject considering subject information. For another example, the photographing controller 130 may identify a capture pose selected by a user. The subject information includes at least one of the number of members of a subject, the relationship between the members, and a photographing location.

The input unit 140 provides input data generated by the user's selection to the controller 100. For example, in the case in which pressing a shutter button by a user is detected, the input unit 140 provides input data generated by the pressing of the shutter button to the controller 100.

The storage unit 150 can be composed of a program storage unit storing a program for controlling an operation of the photographing device and a data storage unit storing data generated during the execution of a program. For example, the storage unit 150 includes at least one capture pose. In another example, the storage unit 150 stores member relationship information used for determining a capture pose in the photographing controller 130. The member relationship information is input by a user or is extracted from previously captured picture data.

The audio processor 160 processes an audio signal that is input/output through the photographing device. For example, the audio processor 160 processes to output a guide voice signal for a pose change of a subject based on a capture pose.

The communication module 170 processes a signal transmitted/received through an antenna. For example, the communication module 170 processes a signal transmitted/received through an antenna used for voice communication and data communication. In another example, the communication module 170 transmits capture pose information to a portable device of a subject to which a communication link is established according to the control of the controller 100. The communication module 170 establishes the communication link with the portable device of the subject according to the user's input, or automatically establishes the communication link with the portable device of the subject according to preset information of the portable device of the subject.

In the aforementioned construction, the controller 100 performs the function of the photographing controller 130. In embodiments of the present invention, these are separately constructed and shown in order to distinguish and describe respective functions. Thus, in the actual implementation, the construction can be such that all or some of the functions of the photographing controller 130 are processed in the controller 100.

Figure 2:
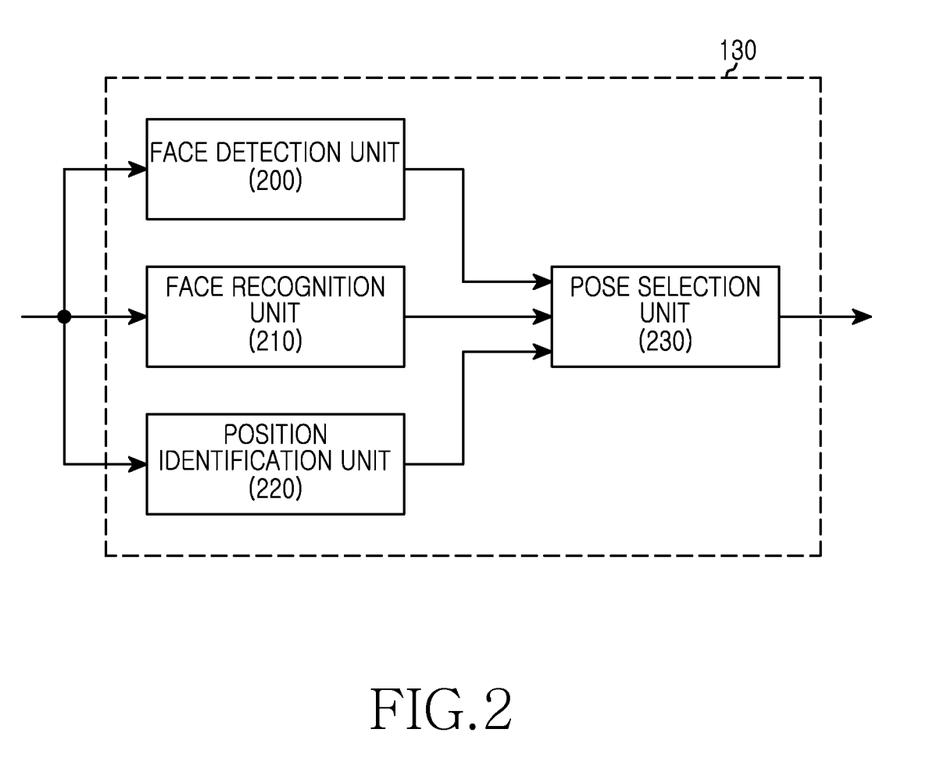
FIG. 2 is a block diagram illustrating a photographing controller according to the present invention.

FIG. 2 illustrates a detailed construction of a photographing controller according to the present invention. It is assumed that the photographing controller 130 determines a capture pose for photographing a subject considering subject information.

As illustrated in FIG. 2, the photographing controller 130 includes a face detection unit 200, a face recognition unit 210, a position identification unit 220, and a pose selection unit 230.

The face detection unit 200 detects the number of members constituting a subject in a preview picture collected through the photographing unit 110.

The face recognition unit 210 identifies the relationship of members of a subject in a preview picture collected through the photographing unit 110. For example, the face recognition unit 210 recognizes a face of a member included in the preview picture. The face recognition unit 210 then identifies the relationship of the recognized members in member relationship information stored in the storage unit 150. The face recognition unit 210 can operate only when the number of members of a subject detected in the face detection unit 200 is greater than or equal to '2'.

The position identification unit 220 identifies a position in which the photographing device photographs a subject. For example, the position identification unit 220 estimates a position for photographing a subject using a Global Navigation Satellite System (GNSS) module. In another example, the position identification unit 220 estimates a position for photographing a subject using a triangulation scheme. In a further example, the position identification unit 220 identifies position information input by a user.

The pose selection unit 230 determines a capture pose considering the number of members of a subject, the relationship information of members of the subject, and position information. For example, the pose selection unit 230 selects one capture pose stored in the storage unit 150 considering the number of members of the subject, the relationship information of the members, and the position information. Further, the pose selection unit 230 may select a capture pose additionally considering the subject or photographer's preference pose information determined considering previously captured picture data.

In the aforementioned embodiment, the photographing controller 130 detects the number of members of a subject using the face detection unit 200.

In another embodiment, the photographing controller 130 identifies the number of members of a subject input by a user.

In the aforementioned embodiment, the photographing controller 130 identifies the relationship of members of a subject using the face recognition unit 210.

In another embodiment, the photographing controller 130 identifies the relationship of members of a subject input by a user.

Figure 3:
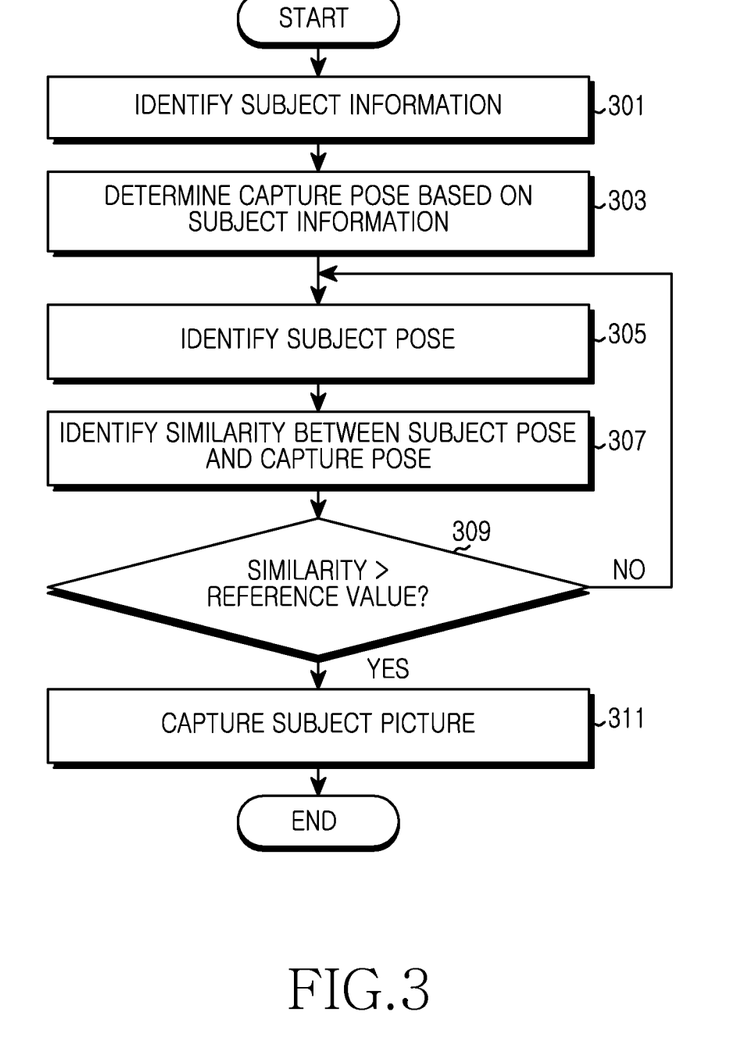
FIG. 3 is a flowchart illustrating a process for automatically photographing a subject in a photographing device according to an embodiment of the present invention.

FIG. 3 illustrates a process for automatically photographing a subject in a photographing device according to an embodiment of the present invention.

Referring to FIG. 3, in step 301, the photographing device identifies subject information for photographing The subject information includes at least one of the number of members of a subject, relationship information of the members, photographing position information, and preference pose information.

After identifying the subject information, the photographing device proceeds to step 303 and determines a capture pose considering the subject information. For example, the photographing device selects one capture pose stored in the storage unit 150 considering the subject information.

The photographing device then proceeds to step 305 and identifies a pose of the subject. For example, the photographing device identifies a pose of the subject in a preview picture acquired through the photographing unit 110.

After identifying the capture pose and the subject pose, the photographing device proceeds to step 307 and determines the similarity between the subject pose and the capture pose. For example, the photographing device compares the subject pose with the capture pose in pixel unit. The photographing device calculates the degree of similarity between the subject pose and the capture pose based on the compared result. As another example, the photographing device compares a composition of the subject pose with the capture pose. The photographing device calculates the degree of similarity between the subject pose and the capture pose based on the compared result.

The photographing device then proceeds to step 309 and compares the similarity between the subject pose and the capture pose with a reference value.

If the degree of similarity between the subject pose and the capture pose is less than or equal to the reference value, then the photographing device recognizes that it cannot photograph the subject since the subject pose is not similar to the capture pose. According to this, the photographing device proceeds to step 305 and again identifies a pose of the subject. The photographing device may display subject pose change information on the display unit 120. The subject pose change information includes guide information provided so that the subject pose is made similar to the capture pose.

However, if the degree of similarity between the subject pose and the capture pose is greater than the reference value, the photographing device recognizes that the subject takes a pose similar to the capture pose. According to this, the photographing device proceeds to step 311 and photographs the subject. That is, the photographing device captures picture data of the subject. After that, the photographing device stores the captured picture data in the storage unit 150.

After that, the photographing device terminates the processing of the algorithm according to the embodiment of the present invention.

In the aforementioned embodiment, the photographing device determines a capture pose considering subject information.

Figure 4:
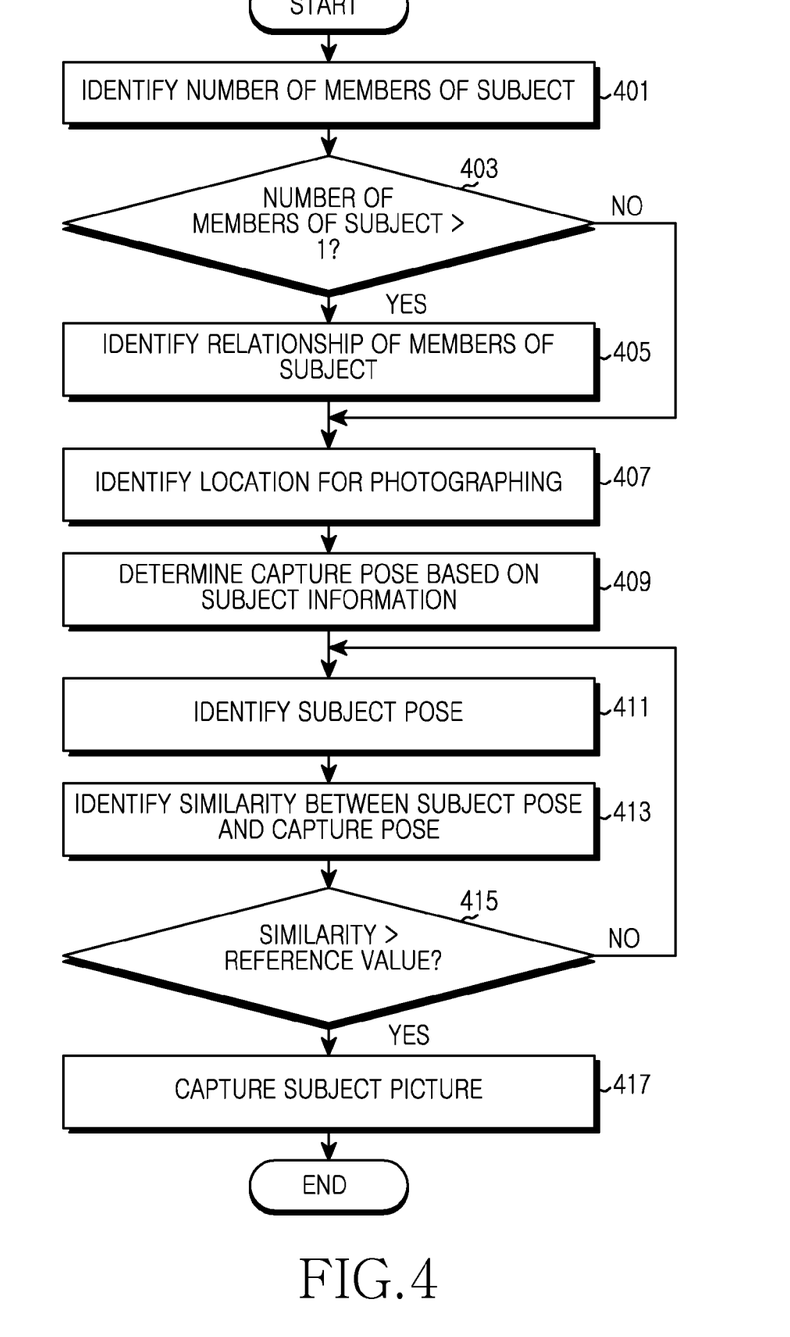
FIG. 4 is a flowchart illustrating a process for determining a capture pose in a photographing device according to an embodiment of the present invention.

In the case of selecting a capture pose considering the number of members of a subject, relationship information of the members, and photographing position information among the subject information, the photographing device operates as illustrated in FIG. 4.

FIG. 4 illustrates a process for determining a capture pose according to subject information in a photographing device according to an embodiment of the present invention.

Referring to FIG. 4, in step 401, the photographing device identifies the number of members of a subject for photographing For example, the photographing device identifies the number of members of a subject using a face detection unit 200 as illustrated in FIG. 2. In another example, the photographing device identifies the number of members of a subject input by a user.

The photographing device then proceeds to step 403 and determines if the number of members of the subject for photographing is greater than or equal to '2'.

If, in step 403, the device determines that the number of members of the subject is less than '2', the photographing device proceeds to step 407 and identifies a location for photographing the subject. For example, the photographing device estimates a position for photographing the subject using a GNSS module. In another example, the photographing device estimates a position for photographing the subject using a triangulation scheme. In a further example, the photographing device identifies position information input by a user.

In contrast, if it is determined in step 403 that the number of members of the subject is greater than or equal to '2', the photographing device proceeds to step 405 and identifies the relationship of members included in the subject. For example, the photographing device recognizes a face of a member included in a preview picture using the face recognition unit 210 of FIG. 2. After that, the photographing device identifies the relationship of the recognized members in member relationship information stored in the storage unit 150. In another embodiment, the photographing device identifies the relationship of members of a subject input by a user.

The photographing device then proceeds to step 407 and identifies a location for photographing the subject.

After identifying the number of members of the subject, the relationship information of the members, and the photographing position information, the photographing device proceeds to step 409 and determines a capture pose considering the number of members of the subject, the relationship information of the members, and the photographing position information. For example, the photographing device selects one capture pose stored in the storage unit 150 considering the number of members of the subject, the relationship information of the members, and the photographing position information.

The photographing device then proceeds to step 411 and identifies a pose of the subject. For example, the photographing device identifies a pose of the subject in a preview picture acquired through the photographing unit 110.

After identifying the capture pose and the subject pose, the photographing device proceeds to step 413 and identifies the similarity between the subject pose and the capture pose. For example, the photographing device calculates the degree of similarity between the subject pose and the capture pose.

The photographing device then proceeds to step 415 and compares the similarity between the subject pose and the capture pose with a reference value.

If the degree of similarity between the subject pose and the capture pose is less than or equal to the reference value, the photographing device determines that it cannot photograph the subject as the subject pose is not similar to the capture pose. Thus, the photographing device returns to step 411 and again identifies a pose of the subject. The photographing device displays subject pose change information on the display unit 120.

However, if the degree of similarity between the subject pose and the capture pose is greater than the reference value, the photographing device recognizes that the subject takes a pose similar to the capture pose. Thus, the photographing device proceeds to step 417 and photographs the subject. That is, the photographing device captures picture data of the subject. The photographing device then stores the captured picture data in the storage unit 150.

The photographing device terminates the process of the algorithm according to the embodiment of the present invention.

The following description is made for a method for transmitting photographing guide information when a subject changes poses.

Figure 5:
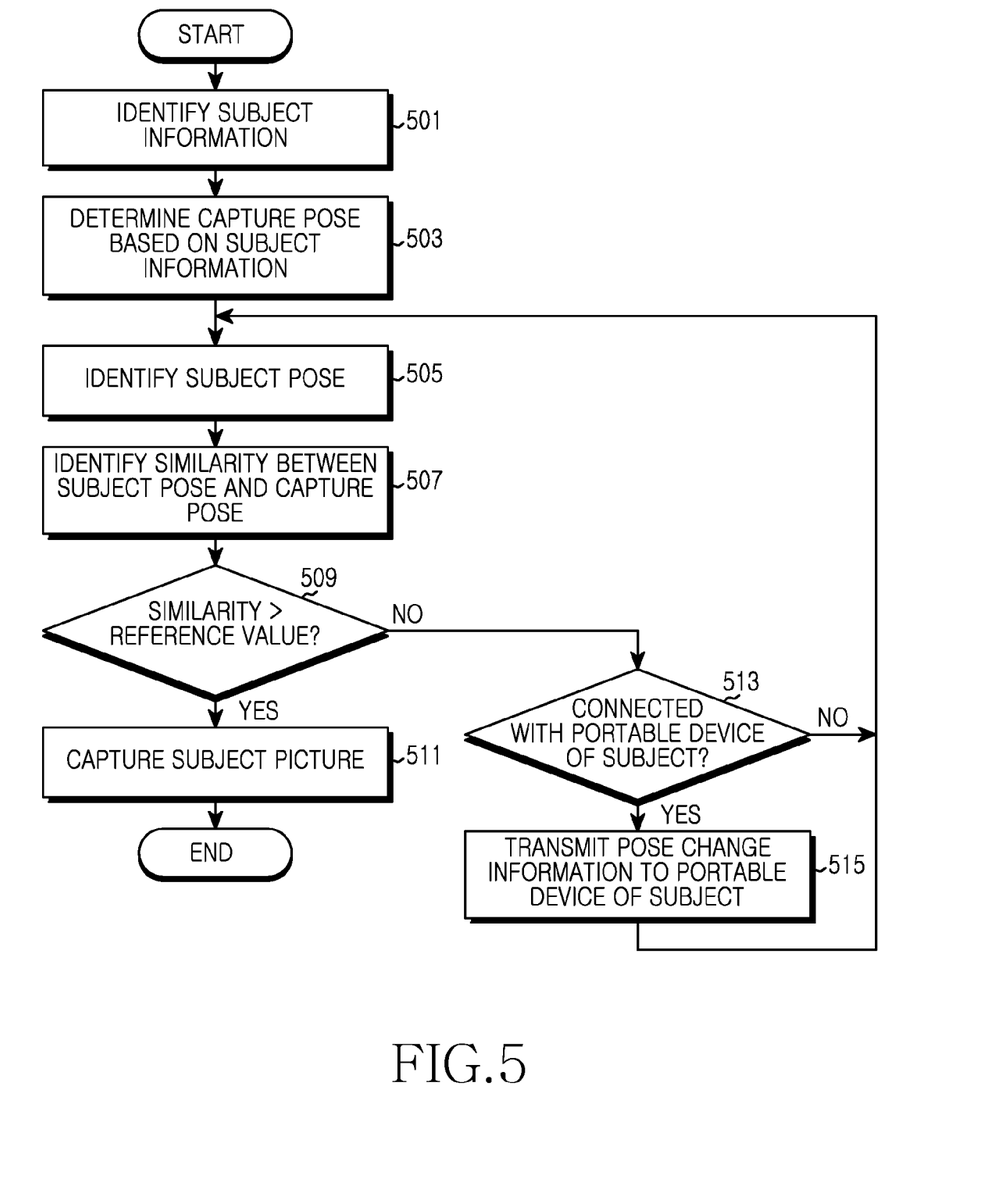
FIG. 5 is a flowchart illustrating a process for transmitting photographing guide information in a photographing device according to an embodiment of the present invention.

FIG. 5 illustrates a process for transmitting photographing guide information in a photographing device according to an embodiment of the present invention.

Referring to FIG. 5, in step 501, the photographing device identifies subject information for photographing The subject information includes at least one of the number of members of a subject, relationship information of the members, photographing position information, and preference pose information.

After identifying the subject information, the photographing device proceeds to step 503 and determines a capture pose considering the subject information. For example, the photographing device selects one capture pose stored in the storage unit 150 considering the subject information.

The photographing device then proceeds to step 505 and identifies a pose of the subject. For example, the photographing device identifies a pose of the subject in a preview picture acquired through the photographing unit 110.

After identifying the capture pose and the subject pose, the photographing device proceeds to step 507 and identifies the similarity between the subject pose and the capture pose. For example, the photographing device calculates the degree of similarity between the subject pose and the capture pose.

The photographing device proceeds to step 509 and compares the similarity between the subject pose and the capture pose with a reference value.

If the degree of similarity between the subject pose and the capture pose is less than or equal to the reference value, the photographing device determines that it cannot photograph the subject as the subject pose is not similar to the capture pose. Thus, the photographing device proceeds to step 513 and determines if a communication link with a portable device of the subject has been established. The photographing device then establishes the communication link with the portable device of the subject by the user's input or establishes the communication link with the portable device of the subject automatically.

If it is identified in step 513 that the communication link with the portable device of the subject has not been established, the photographing device returns to step 505 and again identifies a pose of the subject.

However, if it is identified in step 513 that the communication link with the portable device of the subject has been established, the photographing device proceeds to step 515 and transmits pose change information to the portable device of the subject. For example, the photographing device transmits the capture pose determined in step 503 to the portable device of the subject. In another example, the photographing device may extract a difference between the subject pose identified in step 505 and the capture pose determined in step 503, and transmit the difference to the portable device of the subject.

The photographing device then returns to step 505 and again identifies a pose of the subject.

However, if the degree of similarity between the subject pose and the capture pose is greater than the reference value in step 509, the photographing device determines that the subject takes a pose similar to the capture pose. Thus, the photographing device proceeds to step 511 and photographs the subject. That is, the photographing device captures picture data of the subject. The photographing device then stores the captured picture data in the storage unit 150.

The photographing device then terminates the processing of the algorithm according to the embodiment of the present invention.

In the aforementioned embodiment, the photographing device determines a capture pose considering subject information.

Figure 6:
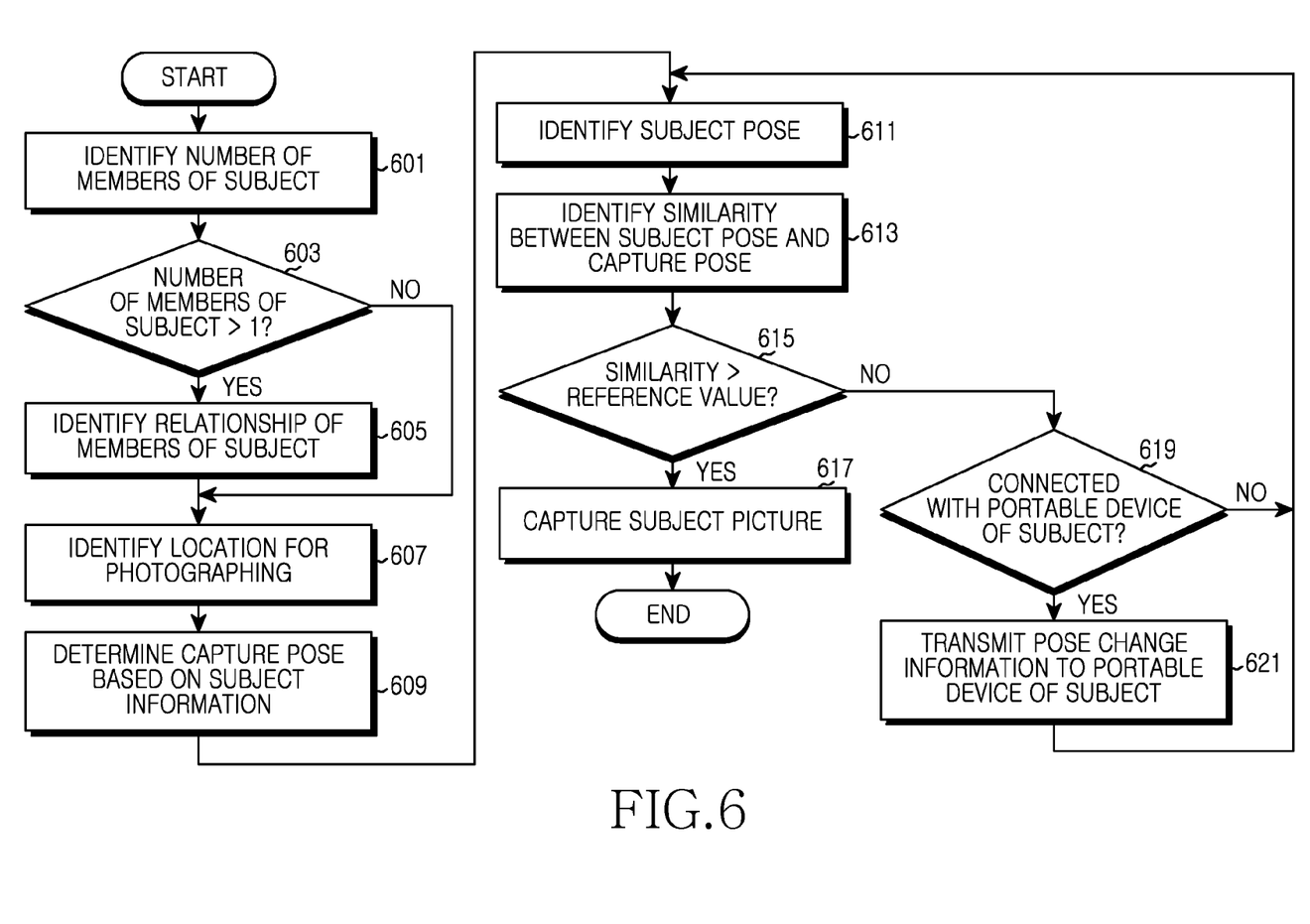
FIG. 6 is a flowchart illustrating a process for transmitting photographing guide information in a photographing device according to another embodiment of the present invention.

In the case in which selecting a capture pose considering the number of members of a subject, relationship information of the members, and photographing position information among the subject information, the photographing device operates as illustrated in FIG. 6.

FIG. 6 illustrates a process for transmitting photographing guide information determined according to subject information in a photographing device according to another embodiment of the present invention.

Referring to FIG. 6, in step 601, the photographing device identifies the number of members of a subject for photographing For example, the photographing device identifies the number of members of a subject using a face detection unit 200 as illustrated in FIG. 2. In another example, the photographing device identifies the number of members of a subject input by a user.

The photographing device then proceeds to step 603 and identifies if the number of members of the subject for photographing is greater than or equal to '2'.

If it is determined in step 603 that the number of members of the subject is less than '2', the photographing device proceeds to step 607 and identifies a location for photographing the subject. For example, the photographing device estimates a position for photographing the subject using a GNSS module. In another example, the photographing device estimates a position for photographing the subject using a triangulation scheme. In a further example, the photographing device may identify position information input by a user.

However, if it is determined in step 603 that the number of members of the subject is greater than or equal to '2', the photographing device proceeds to step 605 and identifies the relationship of members included in the subject. For example, the photographing device recognizes a face of a member included in a preview picture using the face recognition unit 210 of FIG. 2. The photographing device then identifies the relationship of the members in member relationship information stored in the storage unit 150. In another embodiment, the photographing device identifies the relationship of members of a subject input by a user.

The photographing device then proceeds to step 607 and identifies a location for photographing the subject.

After identifying the number of members of the subject, the relationship information of the members, and the photographing position information, the photographing device proceeds to step 609 and determines a capture pose considering the number of members of the subject, the relationship information of the members, and the photographing position information. For example, the photographing device selects one captures post stored in the storage unit 150 considering the number of members of the subject, the relationship information of the members, and the photographing position information.

The photographing device then proceeds to step 611 and identifies a pose of the subject. For example, the photographing device identifies a pose of the subject in a preview picture acquired through the photographing unit 110.

After identifying the capture pose and the subject pose, the photographing device proceeds to step 613 and identifies the similarity between the subject pose and the capture pose. For example, the photographing device calculates the degree of similarity between the subject pose and the capture pose.

The photographing device then proceeds to step 615 and compares the similarity between the subject pose and the capture pose with a reference value.

If the degree of similarity between the subject pose and the capture pose is less than or equal to the reference value, the photographing device recognizes that it cannot photograph the subject since the subject pose is not similar to the capture pose. Thus, the photographing device proceeds to step 619 and identifies if a communication link with a portable device of the subject has been established. The photographing device establishes the communication link with the portable device of the subject based on a user's input or establishes the communication link with the portable device of the subject automatically.

If it is determined in step 619 that the communication link with the portable device of the subject has not been established, the photographing device returns to step 611 and again identifies a pose of the subject.

However, if it is identified in step 619 that the communication link with the portable device of the subject has been established, the photographing device proceeds to step 621 and transmits pose change information to the portable device of the subject. For example, the photographing device transmits the capture pose determined in step 609 to the portable device of the subject. In another example, the photographing device may extract a difference between the subject pose identified in step 611 and the capture pose determined in step 609, and transmit the difference to the portable device of the subject.

The photographing device then returns to step 611 and again identifies a pose of the subject.

If the degree of similarity between the subject pose and the capture pose is greater than the reference value, the photographing device determines that the subject takes a pose similar to the capture pose. Thus, the photographing device proceeds to step 617 and photographs the subject. That is, the photographing device captures picture data of the subject. The photographing device then stores the captured picture data in the storage unit 150.

After that, the photographing device terminates an algorithm according to the embodiment of the present invention.

In the aforementioned embodiment, in a case in which the similarity between the subject pose and the capture pose is less than or equal to the reference value, the photographing device determines if it can transmit pose change information to the portable device of the subject in steps 513 619.

In another embodiment, after determining a capture pose, the photographing device may determine if it can transmit pose change information to the portable device of the subject. If a communication link is established with the portable device of the subject, the photographing device transmits the capture pose to the portable device of the subject.

The following description is made of a method for registering a new capture pose in a photographing device.

FIG. 7 illustrates a process for registering a capture pose in a photographing device according to an embodiment of the present invention.

Referring to FIG. 7, in step 701, the photographing device determines whether to register a capture pose. For example, the photographing device determines if a capture pose registration menu is selected by user's key manipulation.

In the case of not registering the capture pose, the photographing device terminates an algorithm according to the embodiment of the present invention.

In contrast, in a case of registering the capture pose, the photographing device proceeds to step 703 and photographs a subject pose for registering.

The photographing device then proceeds to step 705 and extracts an outline of a subject from the captured picture data.

After extracting the outline of the subject, the photographing device proceeds to step 707 and registers the outline of the subject as a new capture pose.

The photographing device then terminates processing the algorithm according to the embodiment of the present invention.

FIG. 8 illustrates a process for registering a capture pose in a photographing device according to another embodiment of the present invention.

Referring to FIG. 8, in step 801, the photographing device determines whether to register a capture pose. For example, the photographing device determines if a capture pose registration menu is selected by user's key manipulation.

In the case of not registering the capture pose, the photographing device terminates the processing of an algorithm according to the embodiment of the present invention.

However, in the case of registering the capture pose, the photographing device proceeds to step 803 and selects an image for registering a capture pose among previously captured images.

After selecting the image, the photographing device proceeds to step 805 and determines a subject for registering a capture pose among at least one or more subjects included in the selected image.

The photographing device then proceeds to step 807 and extracts an outline of the identified subject.

After extracting the outline of the subject, the photographing device proceeds to step 809 and registers the outline of the subject as a new capture pose.

The photographing device then terminates processing the algorithm according to the embodiment of the present invention. It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, the embodiments of the present invention provides capture pose information considering subject information to a subject in a photographing device, thereby providing an advantage that even the public can photograph the subject of various poses, and the subject can control his/her own pose, reducing a difficulty of intent delivery according to pose change between a photographer and the subject.

Moreover, the embodiments of the present invention automatically photographs a subject according to the similarity between a capture pose considering subject information and a subject pose in a photographing device, thereby being capable of solving a problem that a capture pose of a subject is changed due to a photographing delay.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for photographing a subject using a photographing device, the method comprising:
   determining a capture pose;
   transmitting information of the capture pose to a portable terminal of the subject as an outline or an image representation;
   identifying a pose of the subject corresponding to the transmitted information of the capture pose; and
   capturing the subject automatically based on a similarity between the outline or the image representation of the capture pose and the pose of the subject,
   wherein capturing the subject automatically comprises:
      capturing the subject automatically if a degree of similarity between the capture pose and the pose of the subject is greater than a reference value; and
      transmitting capture pose change information to the portable terminal of the subject if the degree of similarity between the capture pose and the pose of the subject is less than or equal to the reference value.

2. The method of claim 1, wherein determining the capture pose comprises considering at least one of a number of members in a subject, a relationship information of the members, a photographing position information, and a preference pose.

3. The method of claim 2, wherein the number of members in the subject is determined by applying a face detection technique to a subject in a preview screen.

4. The method of claim 2, wherein the relationship information of the members is determined by applying a face recognition technique to a subject in a preview screen, determining recognition information of each member, and comparing the recognition information of the each member and preset member relationship information.

5. The method of claim 2, wherein the photographing position information is estimated based on at least one of Global Navigation Satellite System (GNSS) satellite information and a triangulation scheme.

6. The method of claim 1, wherein capturing the subject automatically comprises determining if the degree of similarity between the capture pose and the pose of the subject is greater than a reference value.

7. The method of claim 6, wherein capturing the subject automatically further comprises: transmitting the capture pose to the portable terminal of the subject if the degree of similarity between the capture pose and the pose of the subject is less than or equal to the reference value.

8. The method of claim 1, wherein the capture pose change information comprises a difference between the capture pose and the subject pose.

9. An apparatus for photographing a subject using a photographing device, the apparatus comprising:
   a display unit configured to display a picture of a subject;
   a communication module configured to transmit information of the capture pose to a portable terminal of the subject as the outline or the image representation;
   a controller configured to determine a capture pose, detect a pose of the subject corresponding to the transmitted information of the capture pose, and control a photographing unit to capture the subject automatically based on a similarity between an outline or an image representation of the capture pose and the pose of the subject; and
   the photographing unit configured to capture the subject,
   wherein the controller is further configured to control the photographing unit to capture the subject automatically if a degree of similarity between the capture pose and the pose of the subject is greater than a reference value,
   control the communication module to transmit capture pose change information to the portable terminal of the subject if the degree of similarity between the capture pose and the pose of the subject is less than or equal to the reference value.

10. The apparatus of claim 9, wherein the controller comprises a photographing controller for determining the capture pose based on at least one of the number of members in a subject, a relationship information of the members, a photographing position information, and a preference pose.

11. The apparatus of claim 10, wherein the photographing controller determines the number of members comprised in the subject by applying a face detection technique to a subject in a preview screen.

12. The apparatus of claim 10, wherein the photographing controller determines the relationship information of the members by applying a face recognition technique to a subject in a preview screen, determining recognition information of each member, and comparing the recognition information of the each member and preset member relationship information.

13. The apparatus of claim 10, wherein the photographing controller estimates the photographing position information based on at least one of Global Navigation Satellite System (GNSS) satellite information and a triangulation scheme.

14. The apparatus of claim 8, wherein the controller controls the photographing unit to capture the subject automatically if the degree of similarity between the capture pose and the pose of the subject is greater than a reference value.

15. The apparatus of claim 14, further comprising:
a communication module for communicating with the subject,
wherein the controller controls the communication module to transmit the capture pose to the portable terminal of the subject if the degree of similarity between the capture pose and the pose of the subject is less than or equal to the reference value.

16. The apparatus of claim 9, wherein the capture pose change information comprises a difference between the capture pose and the subject pose.

* * * * *